Aug. 18, 1964   E. A. SEIZ   3,144,945
STORAGE RACK
Filed March 6, 1962   2 Sheets-Sheet 1
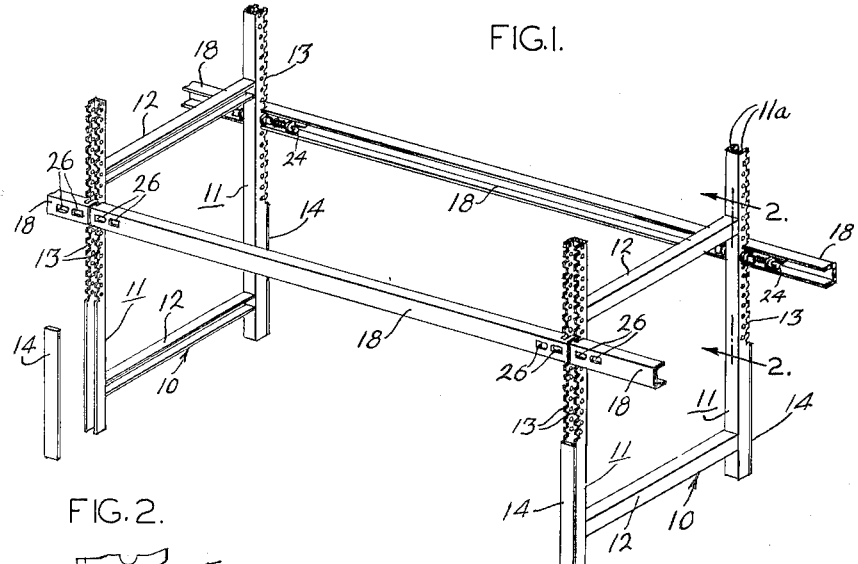
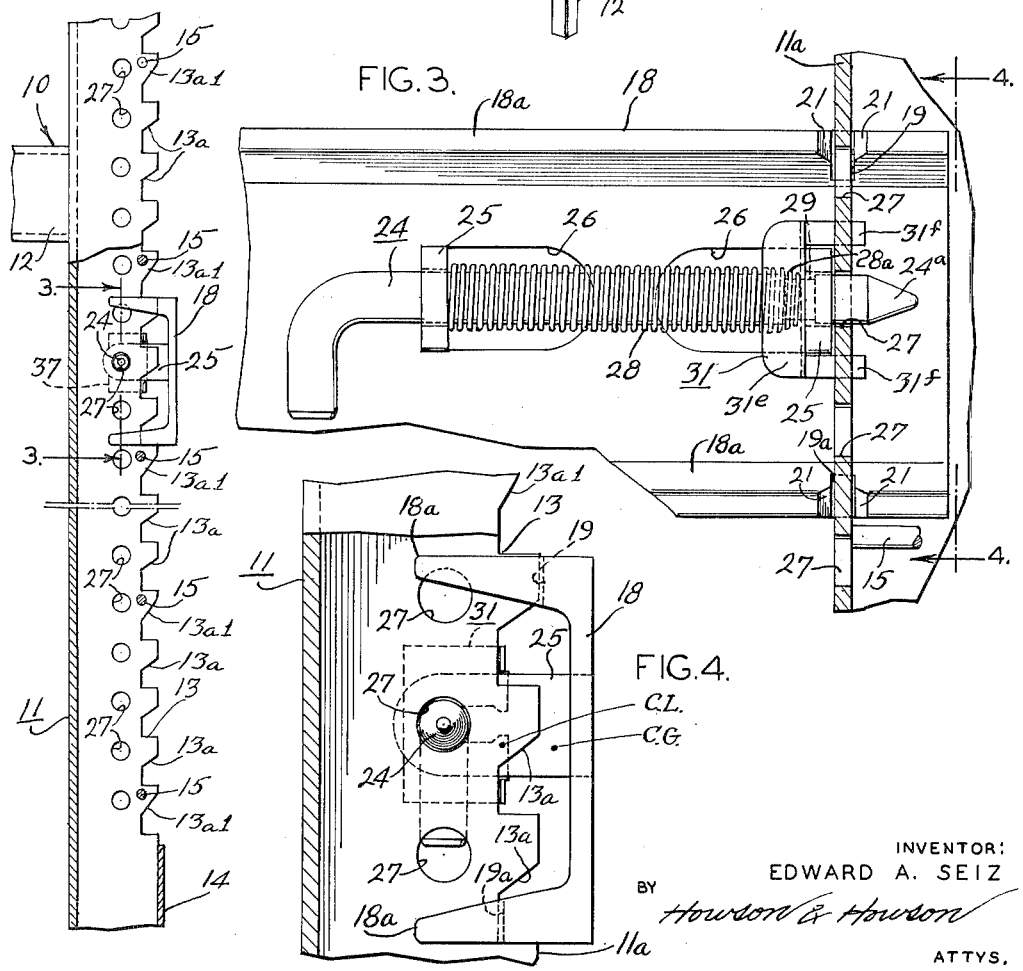
INVENTOR:
EDWARD A. SEIZ
BY Howson & Howson
ATTYS.

Aug. 18, 1964

E. A. SEIZ 3,144,945

STORAGE RACK

Filed March 6, 1962

INVENTOR:
EDWARD A. SEIZ
BY
Howson & Howson
ATTYS.

3,144,945
STORAGE RACK
Edward A. Seiz, 136 E. 3rd St., Lansdale, Pa.
Filed Mar. 6, 1962, Ser. No. 177,841
12 Claims. (Cl. 211—176)

This invention relates to storage racks, particularly to storage racks of the "knockdown" type which can be quickly assembled and disassembled, and has for an object the provision of improvements in this art.

Storage racks of the general type dealt with herein are often used for holding loaded pallets which are handled by fork lift trucks. In such service it frequently happens that the parts being lifted or the lift forks will engage beneath rack elements and displace or dislodge them.

The effects of lifting displacement are particularly damaging when the horizontal goods-supporting rails are hooked into the vertical posts or uprights. Racks which are bolted or welded together fall into a different category.

In order to avoid the displacement or dislodgement of hook-engaged rails it has been the practice to add auxiliary members in the hook-slot joints, sometimes in the form of sliding bolts, sometimes in the form of inserted hook members, and in many other forms.

These auxiliary members have not given very satisfactory service, either because they did not hold securely, or projected out in the way of passage, or became bent, or were difficult to assemble, or for other reasons. Moreover, there was a tendency to omit them when they were not readily available or were lost, as is common with small loose elements.

A difficulty inherent in all of these hook structures is that the racks formed by their use are not very rigid and tend to shift when loaded unless specially braced.

The present invention has for an object the elimination of the difficulties of the character mentioned as well as others by providing connections between horizontal load-bearing rails and vertical supports or posts which fully resist displacement or dislodgement.

Another object is to provide joint connections which can quickly be assembled and dismantled.

Another object is to provide a rack which is very rigid and stable.

Another object is to provide a construction in which the horizontal center of loading on the rails and the center of gravity of the rails falls within or near the horizontal cross-sectional area of the uprights, specifically falling upon or near a rail supporting ledge or notch of the uprights.

Another object is to provide a rack construction which involves no loose parts which are subject to being lost or left out of the assembly.

Another object is to provide a rack construction which includes joint parts which snap together and which requires no tools for assembly.

Another object is to provide an assembly which furnishes ready visual inspection of the condition of the joint parts to insure that they are properly engaged.

Another object is to provide notched supporting posts which readily indicate the proper rail position and which place the rail in correct position for securement to the post.

The above and other objects as well as various novel features and advantages of the invention will be apparent from the following description of an exemplary embodiment thereof, reference being made to the accompanying drawings, wherein:

FIG. 1 is an isometric front and end elevational view of the lower portion of one section of a rack assembly embodying the invention;

FIG. 2 is an enlarged vertical section and elevation taken on the line 2—2 of FIG. 1;

FIG. 3 is an enlarged vertical section taken on the line 3—3 of FIG. 2;

FIG. 4 is a vertical section and elevation taken on the line 4—4 of FIG. 3;

Figure 5:
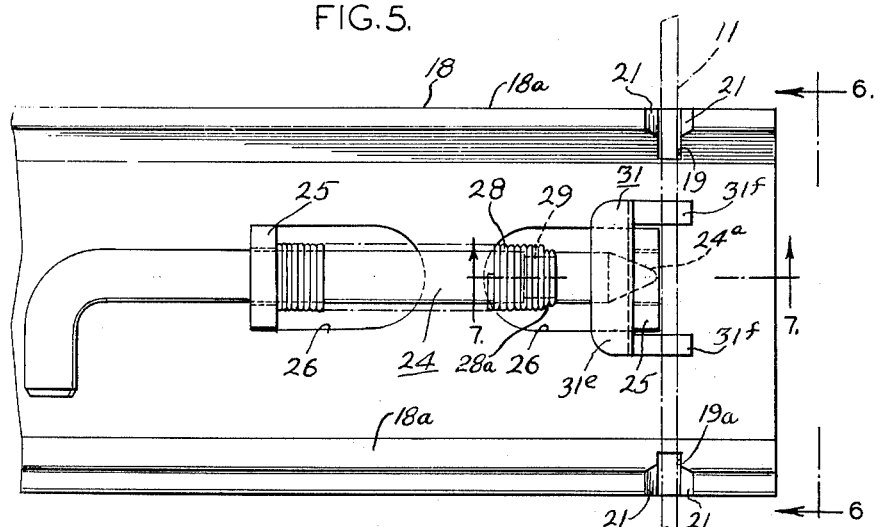
FIG. 5 is a view like FIG. 3 but showing the parts in a pre-final position.

The rack includes a plurality of transverse panels or bents 10, each comprising vertical uprights, columns, or posts 11 and horizontal members 12. These parts are preferably welded together and, if desired, the bents may also have diagonal brace members welded or otherwise secured in the assembly.

The posts 11 are formed as channel members with flanges 11a which, above the height where the lowest shelf is to be located, are notched at their outer edges, as at 13 to engage and support the load-bearing members. Below this the channels may be closed, reinforced, and held against spreading by a plate 14 welded to the flanges 11a. In the notched zone the post flanges 11a may be reinforced and held against spreading by spacers 15 welded in at intervals.

Horizontal load-bearing members or rails 18 are provided for engagement with the posts in the notched zone, the rails being channel-shaped with flanges 18a and with the open side facing inward and with the lower edge resting on the horizontal portions or ledges of the notches 13 of two spaced posts. The upper sides of the notches 13 are tapered inward and downward, as indicated at 13a, to aid in bringing the rail into proper position and at intervals of say every fourth notch the slope is changed, as at index notches 13a1; or some other indicia may be provided to show at a glance the proper height for the opposite ends of the rail to assure that the rail is horizontal.

The flanges 18a of the rails are provided with slots 19, 19a, at the top and bottom respectively, which closely embrace with slight clearance one flange of a post at each end of the rail. The rail flanges 18a may be bevelled, as at 21 at the outer end of the slots for easy insertion on the post flange 11a.

If desired, one of the post flanges may be slightly bent horizontally to wedge in the rail slots when the parts are pushed fully together. See the right flange in FIG. 7 where the angle "x" is made a few degrees off 90 degrees. Such an arrangement makes for a tight rigid assembly and minimizes bending of the rails. But even without this, the rail slots wedge on the post flanges when the rails bend in the middle under load.

If both of the flanges of a rail do not fall in notches of a post flange the upper slot of the rail will be made deeper than the lower slot, as shown for slot 19 in FIGS.

4 and 6, in order to accommodate the additional width of post flange which it embraces.

It will be noted from FIG. 4 that the center of loading C.L. of the rail, which falls at the center of its width, lies well within the outer edge of the notch on which the rail rests, and that the center of gravity C.G. of the rail section lies very near the edge of a notch. This makes for a stable assembly which will not turn or spring under load.

Means are provided for quickly securing the rails to the posts, the arrangement also providing quick disassembly. The means herein shown comprises a slidable locking pin 24 mounted in guide apertures provide in supports 25 carried by a rail, the supports here being formed by striking up tabs from the web of the rail.

The openings 26 left in the rail where the tabs have been struck up provide convenient viewing windows through which to inspect the position of the locking bolt.

The post flanges are provided with vertically spaced holes 27 for the locking pins, the holes being so located that the pins will enter the holes when the rails are fully pushed in (and down by the sloping upper edges of the notches) and when the bottom of the rail rests solidly on the ledge of a notch 13 of a post.

A spring 28 forces the end 24a of the pin inward, one end of the spring being of a smaller diameter, as at 28a, to snap into an annular channel 29 formed in the pin when the pin is pushed into the spring and the other end of the spring engaging one side of the outer guide tab 25.

Means are provided for limiting the outward movement of the pin 24, the means herein provided consisting in forming the spring so that its turns engage each other when the pin is fully pulled out (FIG. 7) so that its inner end cannot get out of its guide means, as will be explained.

Means are provided for holding the locking pin in outer position against its spring and for releasing it to enter a hole when the rail is fully pushed in, the means herein shown comprising a trigger latch 31 which is slidable on the inner guide tab 25.

Figure 6:
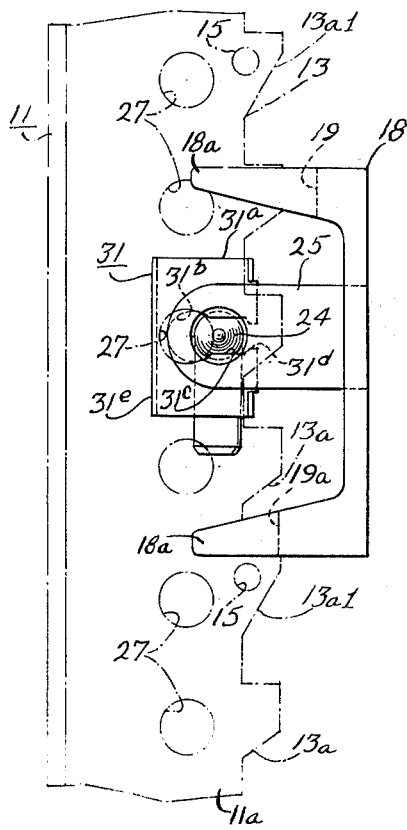
FIG. 6 is a vertical section and elevation like FIG. 4 but taken on the line 6—6 of FIG. 5.
Figure 7:
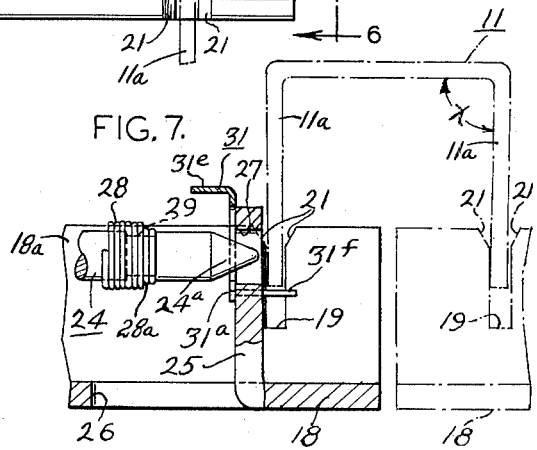
FIG. 7 is a horizontal section taken on the line 7—7 of FIG. 5.
Figure 8:
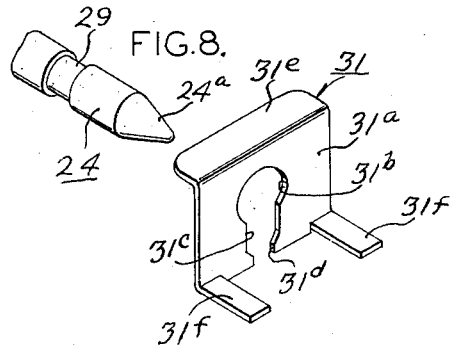
FIG. 8 is an exploded fragmentary perspective view of the locking bolt and its detent trigger.

As best shown in FIGS. 6, 7, and 8, the trigger latch 31 is formed with a main slide body 31a having an elongated side-opening aperture having a large portion 31b of a size to allow the pin to pass through freely, a smaller portion 31c which fits on a tapered end portion 24a of the pin, and side slot portion 31d which allows the latch to be disengaged when the parts are sprung or bent out of position and the pin pulled back sufficiently to permit it.

The trigger latch also includes a bent pull-out tab 31e at one end by which it can be pulled out and a pair of spaced bent tripping tabs 31f at the other end which straddle the pin and its guide tab 25 and stand in position to strike the outer edge of a post flange when the rail is pushed in.

In operation, the locking pins 24 at the ends of a rail are pulled out to the position shown in FIG. 7 and the trigger latch 31 pulled out by the tab 31e until the small portion 31c engages the tapered end of the locking pin. When the locking pin is released its spring forces it against the trigger latch so that the parts are held in this position.

If now, with the locking pins so latched out by the sliding trigger members 31, the rail is pushed in on the post flanges at the ends of the rail and with the bottom of the rail sliding along the ledges of the notches 13 in the post flanges, (or the bottom flange being pushed down by the sloping upper edges of the notches) the tripping tabs 31f will engage the outer edges of the post flanges and hold the trigger latches back as the rail is pushed inward until the large parts 31b of the holes comes to the latch pins to let them slide through and engage in the holes 27 of the flanges of the posts.

When one flange of the post is bent, as in FIG. 7, the rail is engaged first on the bent flange at one end and then is swung into engagement with the straight flange at the other end to obtain the aforesaid wedging action.

When the rails are so secured in place a rigid strong assembly is formed. As load is placed on the rails they bend in the middle and this causes their slots to wedge tightly on the flanges of the posts and make the assembly still more rigid. This is especially true if the post flanges are bent as shown on the right side of FIG. 7.

The front and rear rails at each level may be termed a shelf since pallets may be loaded directly thereon without other supporting means. However, if desired, a board support can be placed on either the lower flanges or tops of the rail pairs; or spaced transverse supports can be placed at intervals along the rails. Such transverse members can rest on the lower flanges of the rails and have their upper surfaces disposed at or near the upper surfaces of the rails.

It is thus seen that the invention provides a storage rack construction which is simple, sturdy, rigid, and dependable, and which can be quickly assembled or dismantled without tools or, at most, with a few simple tools such as a hammer or mallet.

While one embodiment of the invention has been described for purposes of illustration, it is to be understood that there may be various embodiments and modifications within the general scope of the invention.

I claim:

1. An assemblable and disassemblable storage rack comprising in combination, longitudinally spaced bents each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjacent flanges of two posts, said post flanges having pin-receiving holes suitably located for each notch ledge surface, pin guide support means provided between the flanges of the rail at each end, and a retaining pin mounted in the support means at each end of the rail in a position to enter a post flange hole when the rail is pushed in to rest on the ledge surfaces of said post flanges notches and hold the rail laterally against the posts to prevent lateral movement of the rail off said ledge surfaces.

2. An assemblable and disassemblable storage rack comprising in combination, longitudinally spaced bents, each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjcent flanges of two posts, said post flanges having pin-receiving holes suitably located for each notch ledge surface, pin guide support means provided between the flanges of the rail at each end, and a retaining pin mounted in the support means at each end of the rail in a position to enter a post flange hole when the rail is pushed in to rest on the ledge surfaces of said post flange notches and hold the rail laterally against the posts to prevent lateral movement of the rail off said ledge surfaces, the guide support means for said retaining pin being formed as tabs struck out from the web of said rail to leave sight openings therethrough to observe the position of said retaining pin.

3. An assemblable and disassemblable storage rack comprising in combination, longitudinally spaced bents each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjacent flanges of two posts, said post flanges having pin-receiving holes suitably located for each notch ledge surface, pin guide support means provided between the flanges of the rail at each end, and a retaining pin mounted in the support means at each end of the rail in a position to enter a post flange hole when the rail is pushed in to rest on the ledge surface of said post flange notches and hold the rail laterally against the posts to prevent lateral movement of the rail off said ledge surfaces, said posts and rail being so formed and assembled that the center of width and loading of the rail falls upon support ledge surfaces of the post flange notches and the center of gravity of the rail section falls near the support ledge surfaces of the post flange notches.

4. An assemblable and disassemblable storage rack comprising in combination, longitudinally spaced bents each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjacent flanges of two posts, said post flanges having pin-receiving holes suitably located for each notch ledge surface, pin guide support means provided between the flanges of the rail at each end, and a retaining pin mounted in the support means at each end of the rail in a position to enter a post flange hole when the rail is pushed in to rest on the ledge surfaces of said post flange notches and hold the rail laterally against the posts to prevent lateral movement of the rail off said ledge surfaces, at least one of said post flanges being bent laterally to wedge in the rail flange slots.

5. An assemblable and dissassemblable storage rack comprising in combination, longitudinally spaced bents each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjacent flanges of two posts, said post flanges having pin-receiving holes suitably located for each notch ledge surface, pin guide support means provided between the flanges of the rail at each end, and a retaining pin mounted in the support means at each end of the rail in a position to enter a post flange hole when the rail is pushed in to rest on the ledge surfaces of said post flange notches and hold the rail laterally against the posts to prevent lateral movement of the rail off said ledge surfaces, spring means urging said retaining pin into a hole in the post flange, and a trigger latch mounted on the retaining pin and holding it outward against said spring so the end of the pin will clear the post flange until the parts are disposed in fully assembled position.

6. An assemblable and disassemblable storage rack comprising in combination, longitudinally spaced bents each including laterally spaced posts with outwardly facing longitudinally spaced vertical flanges, each flange being provided with a plurality of vertically spaced notches with horizontal lower rail-supporting ledge surfaces, horizontal shelf rails supported on the ledge surfaces of said post flanges, each rail being channel-shaped with inwardly facing flanges, the rail flanges near the ends having slots embracing the adjacent flanges of two posts, said post flanges having pin-receiving holes suitable located for each notch ledge surface, pin guide support means provided between the flanges of the rail at each end, and a retaining pin mounted in the support means at each end of the rail in a position to enter a post flange hole when the rail is pushed in to rest on the ledge surfaces of said post flange notches and hold the rail laterally against the posts to prevent lateral movement of the rail off said ledge surfaces, spring means urging said retaining pin into a hole in the post flange, and a trigger latch mounted on the retaining pin and holding it outward against said spring so the end of the pin will clear the post flange until the parts are disposed in fully assembled position, said trigger latch including elements engageable with a part of the post as the rail is pushed in to release the latch for its spring to force it into the post flange hole.

7. An assemblable and disassemblable storage rack comprising in combination, longitudinally spaced bents each including laterally spaced posts having outwardly extending flanges with vertically spaced rail support notches with horizontal ledges to support an edge of a rail and with inwardly and downwardly tapered upper edges to force the rail edge down on said ledges, said posts also having pin keeper holes near said notches, a rail having a horizontal edge resting on said notch ledges and having keeper locking pins movable thereon resting in said keeper holes.

8. An assemblable and disassemblable storage rack comprising in combination, longitudinally spaced bents each including laterally spaced posts having outwardly extending flanges with vertically spaced rail support notches with horizontal ledges to support an edge of a rail and with inwardly and downwardly tapered upper edges to force the rail edge down on said ledges, said posts also having pin keeper holes near said notches, a rail having a horizontal edge resting on said notch ledges and having keeper locking pins resting in said keeper holes, each keeper locking pin having a reduced end portion and being mounted in guide support means, and a spring mounted on said pin and having a reduced end portion held in the reduced portion of the pin and the other end engaging the pin guide support means to urge the pin into a keeper hole of the post.

9. An assemblable and disassemblable storage rack comprising in combination, longitudinally spaced bents each including laterally spaced posts having outwardly extending flanges with vertically spaced rail support notches with horizontal ledges to support an edge of a rail and with inwardly and downwardly tapered upper edges to force the rail edge down on said ledges, said posts also having pin keeper holes near said notches, a rail having a horizontal edge resting on said notch ledges and having keeper locking pins resting in said keeper holes, said pins each being mounted in guide holes of spaced supporting means, and a spring secured at one end to said pin and at its other end engaging one of said spaced pin supporting means, the spring being of such length that when its coils are compressed together the end of the pin is retained in the other pin supporting means.

10. In an assemblable and disassemblable storage rack, in combination, longitudinally spaced posts having longitudinally spaced outwardly extending flanges, said flanges being provided with vertically spaced notches having horizontal support ledges and tapered guide surfaces thereabove, a channel-shaped rail having vertically spaced inwardly extending flanges provided with notches embracing adjacent flanges of adjacent posts and having the lower flange resting on notch ledges, and releasable means holding said rail to said posts, the rail and posts being so formed and arranged that when assembled the center of width and loading of the rail lies on the surface of said ledges.

11. In an assemblable and disassemblable storage rack, in combination, longitudinally spaced posts having longitudinally spaced outwardly extending flanges, said flanges being provided with vertically spaced notches having horizontal support ledges and tapered guide surfaces thereabove, a channel-shaped rail having vertically spaced inwardly extending flanges provided with notches embracing adjacent flanges of adjacent posts and having the lower flange resting on notch ledges, and releasable means holding said rail to said posts, at least one of the post flanges being bent laterally to wedge in the rail slots for the purposes described.

12. A storage rack comprising in combination, a post having keeper pin holes therein, a rail, a taper-end pin slidably carried by said rail for engaging in a hole in the post, a laterally slidable plate mounted on said pin and having an opening of graduated sizes for said pin, a large portion of the plate opening allowing the body of the pin to pass, and a small portion holding the pin on its tapered end, and a spring urging said pin into said hole when said plate is moved to shift from the small portion to the large portion on said pin.

References Cited in the file of this patent

UNITED STATES PATENTS

| | | |
|---|---|---|
| 1,819,970 | Peden | Aug. 18, 1931 |
| 2,593,247 | Benteman | Apr. 15, 1952 |
| 3,017,037 | McDonnell | Jan. 16, 1962 |
| 3,042,221 | Rasmussen | July 3, 1962 |
| 3,047,108 | D'Altrui | July 31, 1962 |
| 3,055,462 | Steele | Sept. 25, 1962 |

FOREIGN PATENTS

| | | |
|---|---|---|
| 496,756 | Canada | Oct. 13, 1953 |